(12) United States Patent
Miura et al.

(10) Patent No.: US 7,455,158 B2
(45) Date of Patent: Nov. 25, 2008

(54) VISCOUS FLUID COUPLING DEVICE

(75) Inventors: Ryuta Miura, Aichi-ken (JP);
Tsunekazu Yamauchi, Aichi-ken (JP);
Yasuo Ozawa, Aichi-ken (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 225 days.

(21) Appl. No.: 11/188,956

(22) Filed: Jul. 26, 2005

(65) Prior Publication Data

US 2006/0021844 A1     Feb. 2, 2006

(30) Foreign Application Priority Data

Jul. 27, 2004     (JP)     ............. P2004-219256

(51) Int. Cl.
*F16D 35/02*     (2006.01)

(52) U.S. Cl. ............. 192/58.682; 192/58.684; 192/30 V; 192/82 T

(58) Field of Classification Search ............. 192/58.682, 192/58.683, 58.684
See application file for complete search history.

(56) References Cited

U.S. PATENT DOCUMENTS 4,185,726 A * 1/1980 Rohrer ............. 192/58.683
4,431,098 A * 2/1984 Hayashi et al. ............. 192/82 T
4,998,607 A   3/1991 Mizutani et al.
5,509,516 A   4/1996 Yamauchi

FOREIGN PATENT DOCUMENTS

| JP | 54-56069 | 9/1977 |
| JP | 56-34180 | 9/1977 |
| JP | 55-44141 A * | 3/1980 |

* cited by examiner

*Primary Examiner*—Richard M. Lorence
(74) *Attorney, Agent, or Firm*—Reed Smith LLP; Stanley P. Fisher, Esq.; Juan Carlos A. Marquez, Esq.

(57) ABSTRACT

A viscous fluid coupling device includes: a plate that divides a housing into a reservoir chamber and an operation chamber; communication holes that are provided in the plate and communicate the reservoir chamber and the operation chamber; a rotor that is disposed inside the operation chamber and fixed to one end of a drive shaft and rotates integrally with the drive shaft; a valve that is disposed in the reservoir chamber and opens and closes the communication holes, a rod that is fixed at one end to the valve and fixed at the other end to the inner circumferential side of a vortical bimetal and rotatably supported on the housing; a bimetal holder that fixes an attaching outer end formed by bending the outer circumferential side of the bimetal; and a vibration isolator that is disposed between the bimetal holder and the bimetal.

8 Claims, 4 Drawing Sheets

VISCOUS FLUID COUPLING DEVICE

BACKGROUND OF THE INVENTION

1. Field of the Invention

The present invention relates to a viscous fluid coupling device that can be used for cooling fan controllers of internal combustion engines.

2. Description of the Related Art

As a related art of such a viscous fluid coupling device, there is provided a coupling device having following configuration. That is, a conventional viscous fluid coupling device includes: a housing; a partition that divides the housing into a reservoir chamber and an operation chamber; communication holes that are provided in the partition and make the reservoir chamber and the operation chamber to communicate with each other; a rotator that is disposed inside the operation chamber and fixed to one end of a drive shaft and integrally rotates with the drive shaft; a valve that is disposed in the reservoir chamber and opens and closes the communication hole; a rod that is fixed at one end to the valve and fixed at the other end to the inner circumferential side of a vortical bimetal and rotatably supported on the housing; an attaching outer end formed by bending the outer circumferential side of the bimetal outer-circumferentially; and a bimetal holder that fixes the attaching outer end, wherein a T-shaped support is fixed by press-fitting or caulking to the opposite side of the attaching outer end fixing side and the housing; a damper rubber is retained on the inner side of the support by an adhesive, baking adhesion, or the like, and the other surface of the damper rubber is set to be in contact with or maintain a slight distance from the outer circumference of the bimetal (for example, refer to U.S. Pat. No. 4,998,607).

However, in the conventional viscous fluid coupling device, a support is required for reducing vibrations, so that press-fitting or caulking must be carried out. This results in an increase in the number of parts and an increase in the number of assembling steps. Furthermore, vibrations in the rod axial direction of the bimetal caused by vehicle vibrations cannot be reduced.

There is a conventional viscous fluid coupling device provided with a plate to be attached with a rubber vibration isolator for preventing bimetal vibrations is also available (for example, refer to JP-UM-A-54-056069).

However, in the conventional viscous fluid coupling device, the rubber vibration isolator comes into contact with the plate from the outer circumferential direction of the bimetal, and is disposed at the outside of the bimetal. This results in an increase in the number of parts and an increase in assembling steps. In addition, vibrations in the rod axial direction of the bimetal cannot be reduced. Furthermore, a plurality of thinning holes are provided for more contacting the bimetal with the outside temperature, however, only forming these holes cannot prevent the air flow passing through a radiator from being limited, and the bimetal sensitivity lowers, and the bimetal may not normally operate.

On the other hand, the viscous fluid coupling device is disposed at the rear side of a radiator and the bimetal detects the air temperature at the rear side of the radiator and controls the viscous fluid coupling device, however, when the viscous fluid coupling device operates and the temperature of the viscous fluid coupling device rises, due to heat release from the housing of the viscous fluid coupling device, the bimetal may malfunction.

SUMMARY OF THE INVENTION

The present invention provides a viscous fluid coupling device in which axial vibrations of a bimetal is reduced by a simple structure.

According to a first aspect of the invention, there is provided a viscous fluid coupling device including: a housing; a partition that divides the housing into a reservoir chamber and an operation chamber; a communication hole that is provided in the partition communicates the reservoir chamber and the operation chamber; a rotor that is disposed inside the operation chamber, the rotor being fixed to one end of a drive shaft and integrally rotates with the drive shaft; a valve that is disposed in the reservoir chamber and opens and closes the communication hole; a bimetal that deforms according to an ambient temperature and controls the valve to open and close by the deformation, and has an attaching portion formed at one end thereof; a rod that is fixed at one end to the inner circumferential side of the bimetal and fixed at the other end to the valve, and is rotatably supported by the housing; a bimetal holder that fixes the attaching portion of the bimetal to the housing; and a vibration isolator that is disposed between the bimetal holder and the bimetal.

According to a second aspect of the invention, there is provided a viscous fluid coupling device including: a housing; a partition that divides the housing into a reservoir chamber and an operation chamber; a communication hole that is provided in the partition and communicates the reservoir chamber and the operation chamber; a rotor that is disposed inside the operation chamber, the rotor being fixed to one end of a drive shaft and integrally rotates with the drive shaft; a valve that is disposed in the reservoir chamber and opens and closes the communication hole; a rod that has one end extending outside of the housing and the other end fixed to the valve, and is rotatably supported by the housing; a bimetal that is formed in a vortical shape and deforms according to an ambient temperature and controls the valve to open and close by the deformation, the bimetal having a central side end connected to one end of the rod and an attaching outer end formed by bending the outer circumferential side end radially outward; a bimetal holder that is disposed between the housing and the bimetal and fixed at the housing, the bimetal holder fixing the bimetal at the attaching outer end; and a vibration isolator that is attached with an adhesive on a surface of the bimetal holder, the surface opposing to the bimetal.

DETAILED DESCRIPTION OF THE PREFERRED EMBODIMENTS

Referring now to the accompanying drawings, a description will be given in detail of an embodiment of the invention.

Figure 1:
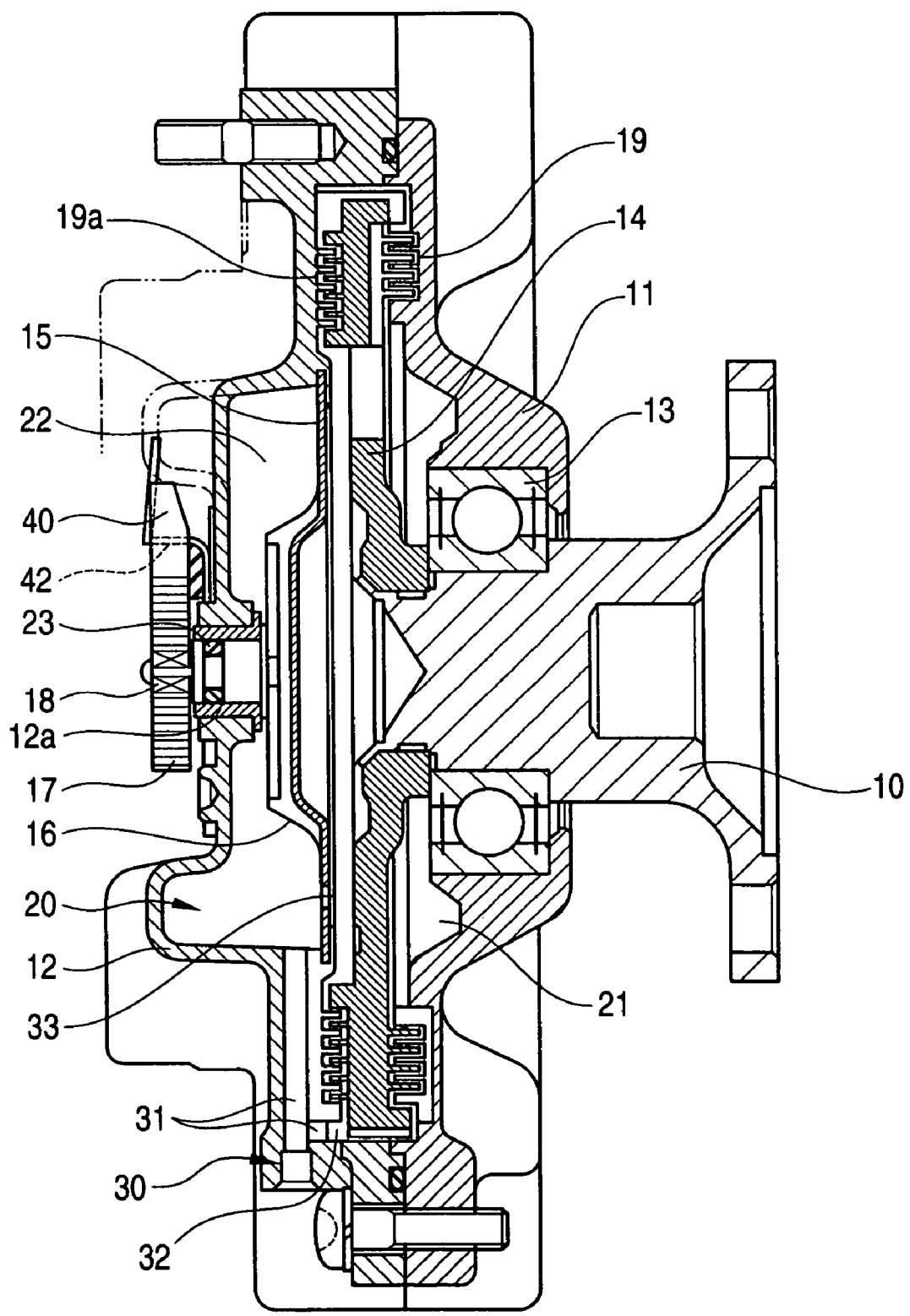
FIG. 1 is a sectional view along I-I line in FIG. 2 of a viscous fluid coupling device according to an embodiment.
Figure 2:
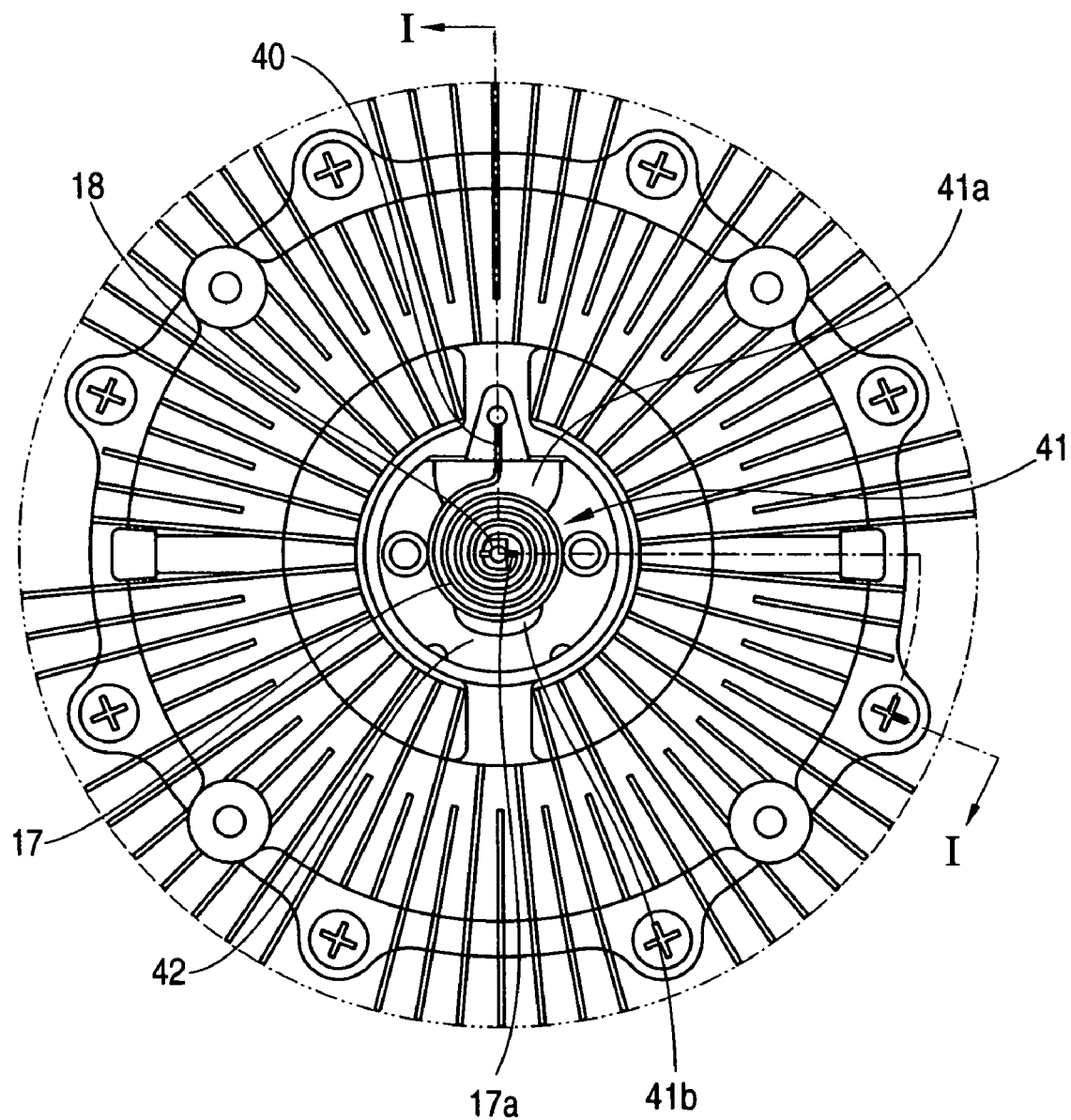
FIG. 2 is a plan view from a bimetal fixing side of the viscous fluid coupling device.

As shown in FIGS. 1 and 2, the viscous fluid coupling device includes a drive shaft 10, a case 11, a cover 12, a bearing 13, a rotor 14, a partition (hereinafter, referred to as a plate) 15, a valve 16, a bimetal 17, a rod 18, and a bimetal holder 42. The case 11 and the cover 12 form a housing.

To the drive shaft 10, a disk-shaped rotor 14 is fixed, and the drive shaft rotates integrally with the rotor 14. The case 11 is rotatably supported to the drive shaft 10 via the bearing 13 for housing the rotor 14. On a torque transmitting surface at which the rotor 14 and the case 11 face, a labyrinth groove 19 is formed. Furthermore, a labyrinth groove 19a is also formed on a torque transmitting surface at which the rotor 14 and the cover 12 face. To the illustrated left end face of the case 11, the cover 12 is integrally fixed. The case 11 and the cover 12 form an internal space 20.

The outer circumferential end of the plate 15 is fixed to the cover 12, and this plate 15 divides the internal space 20 into an operation chamber 21 in which the rotor 14 is housed and a reservoir chamber 22 on the cover 12 side. In the surface near the outer circumferential end of this plate 15, two communication holes 33 (only one is shown) that make the reservoir chamber 22 and the operation chamber 21 to communicate with each other are provided, and a pump hole 31 and a pump projection 32 form a pump mechanism 30. This pump hole 31 makes the operation chamber 21 and the reservoir chamber 22 to communicate with each other. The communication holes 33 are opened and closed by the valve 16. Inside the operation chamber 21 and the reservoir chamber 22, a viscous fluid (for example, silicon oil) is sealed.

To one end of the rod 18, an end 17a on the center side of a vortical bimetal 17 is fixed, and to the other end, a plate-shaped valve 16 that rotates integrally with the rod 18 is fixed. Further, the one end of the rod 18 is extended outside the case 12, and the bimetal 17 fixed to the one end is also disposed outside the case. The rod 18 is provided with a seal member 23, and prevents leak of the viscous fluid between the same and a bush 12a press-fitted in and fixed to the cover 12. The valve 16 is disposed so that its one end opens and closes the communication hole 33 and the other end opens and closes the communication hole (not shown). The bimetal 17 operates by detecting the air temperature at the rear side of the radiator, and the valve 16 controls to open and close the communication hole 33 of the plate 15 via the rod 18 according to the operation of the bimetal 17.

Next, a structure in which a vibration isolator 41 is disposed between the bimetal 17 and the bimetal holder 42 is described.

Figure 3:
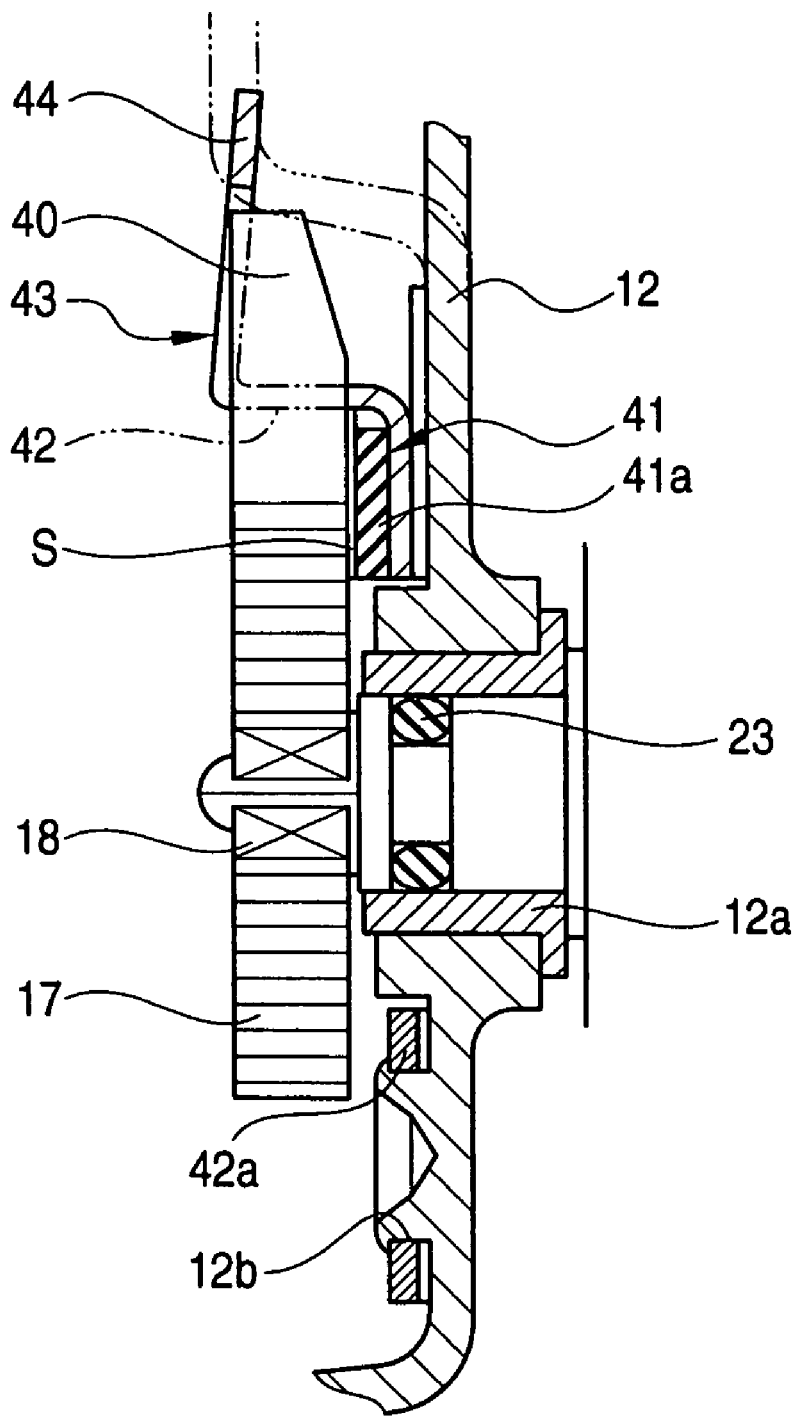
FIG. 3 is an enlarged view of the viscous fluid coupling device.
Figure 4:
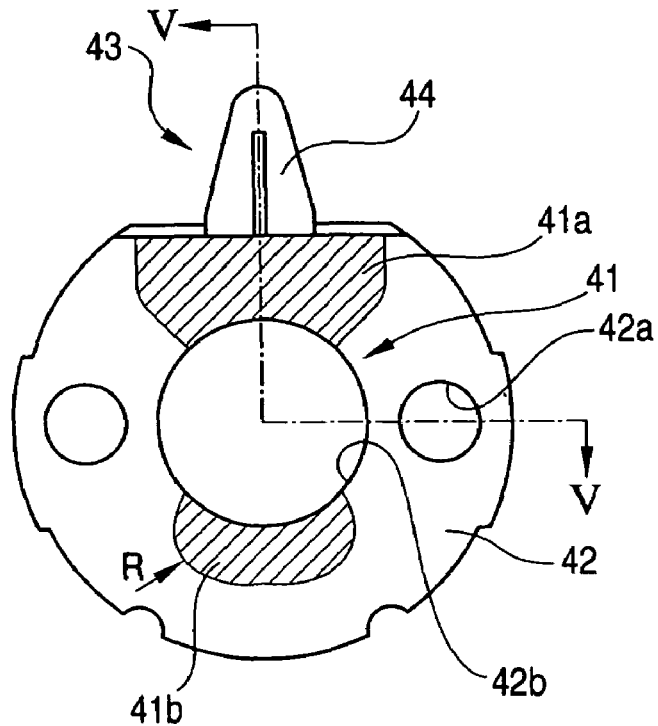
FIG. 4 is a plan view of a bimetal holder of the viscous fluid coupling device.
Figure 5:
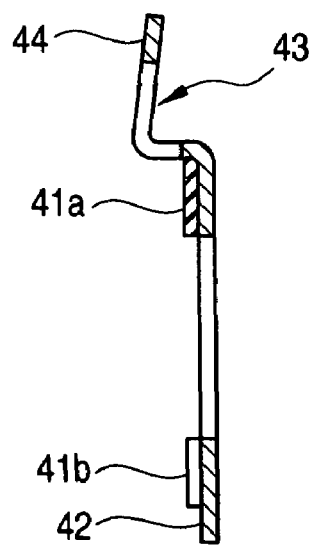
FIG. 5 is a sectional view along V-V line in FIG. 4 of the bimetal holder.

As shown in FIG. 3 and FIG. 4, the bimetal holder 42 is disposed outside the case 12 between the case 12 and the bimetal 17. In the bimetal holder 42, an insertion hole 42b is formed, and one end of the rod 18 is inserted in the insertion hole 42b. Namely, the bimetal holder 42 extends to the attaching outer end side and the opposite side of the attaching outer end from the center side end 17a of the bimetal 17 to be connected to the rod 18. Furthermore, the fixing portion 43 of the bimetal holder 42 is bent toward the attaching outer end 40 side and then bent in the outer circumferential direction of the attaching outer end 40. This bent end 44 is fixed to the attaching outer end 40 of the bimetal 17 by welding. The attaching outer end 40 serves as an attaching portion. The bimetal holder 42 is fixed by externally inserting an annular projection 12b formed on the cover 12 through the hole 42a of the bimetal holder 42 and caulking the head of the annular projection 12b.

Between the bimetal holder 42 and the bimetal 17, a vibration isolator 41 made of a rubber vibration isolator with heat resistance is disposed. As shown in FIG. 4, the vibration isolator 41 includes a first vibration isolator 41a to be fixed to the attaching outer end 40 side of the bimetal holder 42 and a second vibration isolator 41b to be fixed to the opposite side of the attaching outer end 40 via a rod 18.

The bimetal 17 and the vibration isolator 41 are disposed so as to be in contact with each other or maintain a slight distance S from each other.

The distance between the bimetal 17 and the second vibration isolator 41b is set to be longer than the distance between the bimetal 17 and the vibration isolator 41a by considering variation in assembling dimensions of the bimetal 17 and the rod 18 and the variation in the machining dimensions of the cover 12 and the rod 18.

The first and the second vibration isolators 41a and 41b are fixed to the bimetal holder 42 by a vulcanizing adhesion. The fixing method for the vibration isolator 41 may be other than the vulcanizing adhesion. Preferably, the outer circumferential shapes of the first and the second vibration isolators 41a and 41b are rounded. For example, when an adhesive is injection-applied to the vibration isolators 41a ad 41b and the first and the second vibration isolators 41a and 41b are closely attached to the bimetal holder 42, the adhesive is spread circumferentially (a round shape). Therefore, the application shape of the adhesive and the outer circumferential shapes of the first and the second vibration isolators 41a and 41b match each other, whereby a portion with no adhesive applied can be eliminated, and the first and the second vibration isolators 41a and 42b can be prevented from separating from the bimetal holder 42.

Next, an operation of the coupling device according to the embodiment is described.

The rotor 14 rotates integrally with the drive shaft 10 which is connected to a drive means that is not shown and driven to rotate. Thereby, the viscous fluid inside the operation chamber 21 successively flows into the reservoir chamber 22 due to the working of the pump mechanism 30. Due to the movement of the bimetal 17 according to the air temperature at the rear side of the radiator, the valve 16 opens the communication hole 33 of the plate 15 via the rod 18. The valve 16 restricts the flow volume of the viscous fluid between the reservoir chamber 21 and the operation chamber 21 by opening and closing the communication hole 33 and controls the transmission torque from the drive shaft 10 to the housing.

When the bimetal 17 is at a high temperature, the communication hole 33 opens, and the viscous fluid flows from the reservoir chamber 22 to the operation chamber 21. When the bimetal 17 is at a low temperature, the valve 16 closes the communication hole 33 according to the bimetal 17. Thereby, the flow volume of the viscous fluid to the operation chamber 21 is controlled, and the transmission torque from the drive shaft 10 to the housing is controlled.

On the other hand, during operation, in the viscous fluid coupling device, the bimetal 17 is about to vibrate axially due to vehicle vibrations. However, in this embodiment, since the vibration isolator 41 is disposed between the bimetal holder 42 and the bimetal 17, axial vibrations of the bimetal 17 can be reduced by the simple structure. The vibration isolator 41 includes vibration isolators 41a and 41b fixed to the attaching outer end 40 side and the opposite side of the attaching outer end 40 via the rod 18 on the bimetal holder 42. Thereby, movements of the bimetal 17 in the axial direction of the rod 18 are restricted at a position closest to the fixing portion at which the bimetal 17 and the bimetal holder 42 are fixed by welding, whereby a shearing force to be applied to the fixing portion can be reduced. In addition, movements of the bimetal 17 in the axial direction of the rod 18 are restricted at a position most distant from the fixing portion and moment to be applied to the fixing portion can be reduced.

In addition, in the embodiment, the vibration isolator 41 is made of a heat insulating material, so that heat release from the viscous fluid coupling device can be blocked by the vibration isolator 41, whereby the bimetal 17 is prevented from malfunctioning.

As described above with reference to the embodiment, axial vibrations of the bimetal can be reduced by the simple structure by disposing a vibration isolator between the bimetal holder and the bimetal.

According to the embodiment, since the vibration isolator is made of a heat insulating material, heat release from the viscous fluid coupling device can be blocked by the vibration isolator, whereby the bimetal can be prevented from malfunctioning.

According to the embodiment, the vibration isolator is fixed to the attaching outer end side and the opposite side via a rod on the bimetal holder, respectively, so that the movements of the bimetal in the rod axial direction can be restricted at a position closest to the fixing portion between the bimetal and the bimetal holder and a shearing force to be applied to the fixing portion is reduced, and at a position most distant from the fixing portion, movements of the bimetal in the rod axial direction are restricted, whereby moment to be applied to the fixing portion can be reduced.

According to the embodiment, by rounding the outer circumferential shape of the vibration isolator, the application shape of an adhesive that fixes the vibration isolator and the bimetal holder and the outer circumferential shape of the vibration isolator match each other, whereby a portion with no adhesive applied can be eliminated.

The foregoing description of the embodiment of the invention has been presented for purposes of illustration and description. It is not intended to be exhaustive or to limit the invention to the precise form disclosed, and modifications and variations are possible in light of the above teachings or maybe acquired from practice of the invention. The embodiments are chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A viscous fluid coupling device comprising:
    a housing;
    a partition that divides the housing into a reservoir chamber and an operation chamber;
    a communication hole that is provided in the partition communicates the reservoir chamber and the operation chamber;
    a rotor that is disposed inside the operation chamber, the rotor being fixed to one end of a drive shaft and integrally rotates with the drive shaft;
    a valve that is disposed in the reservoir chamber and opens and closes the communication hole;
    a bimetal that deforms according to an ambient temperature and controls the valve to open and close by the deformation, and has an attaching portion formed at one end thereof;
    a rod that is fixed at one end to the inner circumferential side of the bimetal and fixed at the other end to the valve, and is rotatably supported by the housing;
    a bimetal holder that fixes the attaching portion of the bimetal to the housing; and
    a vibration isolator that is disposed between the bimetal holder and the bimetal, the bimetal holder being disposed on a side of the housing,
    wherein the vibration isolator is made of a heat insulating material or a heat insulating rubber,
    wherein the vibration isolator is joined to the bimetal holder,
    wherein the vibration isolator is fixed to a first attaching portion side and a second attaching end side on the bimetal holder, the first attaching portion and the second attaching end portion being on either side of the rod, and
    wherein the vibration isolator includes:
    a first vibration isolator that is fixed to the first attaching portion side of the bimetal holder; and
    a second vibration isolator that is fixed to the second attaching portion side of the bimetal holder.

2. The viscous fluid coupling device according to claim 1, wherein at least a part of an outer circumferential of the vibration isolator is rounded, the at least a part being in the second attaching portion side.

3. The viscous fluid coupling device according to claim 1, wherein at least a part of an outer circumferential of the vibration isolator is rounded, the at least a part being in the oposite side of the attaching outer side.

4. A viscous fluid coupling device, comprising:
    a housing:
    a partition that divides the housing into a reservoir chamber and an operation chamber;
    a communication hole that is provided in the partition communicates the reservoir chamber and the operation chamber;
    a rotor that is disposed inside the operation chamber, the rotor being fixed to one end of a drive shaft and integrally rotates with the drive shaft;
    a valve that is disposed in the reservoir chamber and opens and closes the communication hole;
    a bimetal that deforms according to an ambient temperature and controls the valve to open and close by the deformation, and has an attaching portion formed at one end thereof;
    a rod that is fixed at one end to the inner circumferential side of the bimetal and fixed at the other end to the valve, and is rotatably supported by the housing;
    a bimetal holder that fixes the attaching portion of the bimetal to the housing; and
    a vibration isolator that is disposed between the bimetal holder and the bimetal, the bimetal holder being disposed on a side of the housing,
    wherein the vibration isolator is fixed to a first attaching portion side and a second attaching portion side on the bimetal holder, the first attaching portion and the second attaching portion being on either side of the rod, and
    wherein the vibration isolator includes:
    a first vibration isolator that is fixed to the first attaching portion side of the bimetal holder; and
    a second vibration isolator that is fixed to the second attaching portion side of the bimetal holder.

5. The viscous fluid coupling device according to claim 4, wherein at least a part of an outer circumferential of the vibration isolator is rounded, the at least a part being in the second attaching end side.

6. A viscous fluid coupling device comprising:
    a housing;
    a partition that divides the housing into a reservoir chamber and an operation chamber;

a communication hole that is provided in the partition and communicates the reservoir chamber and the operation chamber;

a rotor that is disposed inside the operation chamber, the rotor being fixed to one end of a drive shaft and integrally rotates with the drive shaft;

a valve that is disposed in the reservoir chamber and opens and closes the communication hole;

a rod that has one end extending outside of the housing and the other end fixed to the valve, and is rotatably supported by the housing;

a bimetal that is formed in a vortical shape and deforms according to an ambient temperature and controls the valve to open and close by the deformation, the bimetal having a central side end connected to one end of the rod and an attaching outer end formed by bending the outer circumferential side end radially outward;

a bimetal holder that is disposed between the housing and the bimetal and fixed at the housing, the bimetal holder fixing the bimetal at the attaching outer end; and a vibration isolator that is attached on a surface of the bimetal holder, the surface opposing to the bimetal, the bimetal holder being disposed on a side of the housing, wherein the bimetal holder extends from the center side end of the bimetal to the attaching outer end side and an opposite side of the attaching outer end, and wherein the vibration isolator is joined to the attaching outer end side of the bimetal holder and the opposite side of the attaching outer end, the attaching outer side and the opposite side of the attaching outer side being on either side of the center side end of the bimetal, and wherein the vibration isolator includes:

a first vibration isolator that is fixed to the attaching outer end side of the bimetal holder; and a second vibration isolator that is fixed to the opposite side of the attaching outer end side of the bimetal holder.

7. The viscous fluid coupling device according to claim 6, wherein the vibration isolator is made of a heat insulating material.

8. The viscous fluid coupling device according to claim 7, wherein the vibration isolator is made of a heat insulating rubber.

* * * * *